United States Patent
Ke

[11] Patent Number: 5,743,360
[45] Date of Patent: Apr. 28, 1998

[54] ADJUSTABLE BICYCLE BRAKE

[75] Inventor: Howard Ke, Taichung Hsien, Taiwan

[73] Assignee: Dia-Compe, Taiwan, Co., Ltd., Taichung, Taiwan

[21] Appl. No.: 759,217

[22] Filed: Dec. 5, 1996

[51] Int. Cl.[6] .................. B62L 1/06; B62L 3/00
[52] U.S. Cl. ................... 188/24.19; 188/24.22
[58] Field of Search ............... 188/24.12, 24.14, 188/24.15, 24.16, 24.19, 24.22, 73.1; 403/13, 14

[56] References Cited

U.S. PATENT DOCUMENTS

| 4,263,990 | 4/1981 | Yoshigai | 188/24.19 |
| 4,301,894 | 11/1981 | Arai | 188/24.19 |
| 4,511,018 | 4/1985 | Scott | 188/24.12 |
| 4,765,443 | 8/1988 | Cunningham | 188/24.19 |
| 4,766,979 | 8/1988 | Nagano | 188/24.19 |

FOREIGN PATENT DOCUMENTS

| 493684 | 6/1950 | France | 188/24.19 |
| 0985433 | 7/1951 | France | 188/24.19 |
| 0069121 | 4/1982 | Japan | 188/24.12 |

Primary Examiner—Robert J. Oberleitner
Assistant Examiner—Chris Schwartz
Attorney, Agent, or Firm—Browdy and Neimark

[57] ABSTRACT

An adjustable bicycle brake comprises two brake arms, two brake shoes fastened respectively with the brake arms, and one tension spring. The brake arms are fastened pivotally and symmetrically with a bicycle frame and are provided respectively with a stopping block. The tension spring is fastened at both ends thereof with the brake arms and is provided with two pushing blocks urging the stopping blocks of the brake arms. The pushing blocks can be displaced to bring about the displacements of the brake arms so as to adjust the brake shoes to be separated equidistantly from the bicycle wheel.

6 Claims, 6 Drawing Sheets

ADJUSTABLE BICYCLE BRAKE

FIELD OF THE INVENTION

The present invention relates generally to a bicycle brake, and more particularly to an adjustable bicycle brake.

BACKGROUND OF THE INVENTION

As shown in FIG. 1, a bicycle brake of the prior art comprises two brake arms 1, which are fastened pivotally and respectively at the bottom end thereof with the front fork or the rear fork of a bicycle. Located between two brake arms 1 are two brake shoes 3, which are forced respectively by a coil spring 2 to remain apart from a bicycle wheel 4 at such time when the bicycle brake is not at work. These two brake arms 1 are fastened respectively at the top end thereof with a brake cable 5, which is connected with the brake lever via a retaining piece 6. When the brake lever is put into action, as indicated by the dotted lines in FIG. 1, both brake cables 5 and the retaining piece 6 are pulled to displace in the direction towards the brake lever so as to cause the brake shoes 3 to engage the wheel 4, which is then brought to a halt. As the brake lever is released, the brake arms 1 are forced by the elastic force of the coil springs 2 to return to their original positions, thereby enabling the wheel 4 to be in motion again.

The prior art bicycle brake described above has shortcomings, which are explicitly expounded hereinafter.

The braking effect of the prior art bicycle brake can not be brought about with precision unless the retaining piece 6 is located precisely at the center of a space between two frame bodies such that two brake shoes 3 are located apart equidistantly from the wheel 4, so as to enable the brake shoes 3 to exert equally a braking force on the wheel 4. The alignment of the retaining piece 6 and the fixation of the brake arms 1 can not be done without the special tools and are rather time-consuming. In addition, the retaining piece 6 is vulnerable to displacement after the prolonged use of the retaining piece 6. As a result, the two brake arms 1 are not spaced apart equally from the wheel 4 such that the braking effect can not be brought about precisely and efficiently. Without the help of the specific tools as well as the technical expertise of a professional, a bicyclist is unable to do the job of adjusting the brake arms 1 by himself or herself.

Another shortcoming of the prior art bicycle brake is that the coil spring 2 is fastened at one end thereof with the brake arm 1 and at another end thereof with the bicycle frame body, thereby requiring one hand to hold the coil spring 2 while the brake arm 1 is being installed with another hand.

SUMMARY OF THE INVENTION

It is therefore the primary objective of the present invention to provide a bicycle brake which can be easily adjusted without the use of a special tool.

It is another objective of the present invention to provide a bicycle brake which is simple in construction and can be assembled easily and economically.

In keeping with the principle of the present invention, the foregoing objectives of the present invention are attained by an improved bicycle brake, which comprises two symmetrical brake arms, two brake shoes, and one tension spring. The brake arms are fastened pivotally and symmetrically with the bicycle frame and are provided respectively with a stopping block. The tension spring is fastened pivotally at both ends thereof with the brake arms and is provided with two pushing blocks capable of being actuated to bring about the displacement of the brake arms so as to adjust the gap between the brake shoes and the bicycle wheel.

The foregoing objectives, features, functions, and advantages of the present invention will be more readily understood upon a thoughtful deliberation of the following detailed description of the present invention in conjunction with the accompanying drawings.

DETAILED DESCRIPTION OF THE INVENTION

Figure 1:
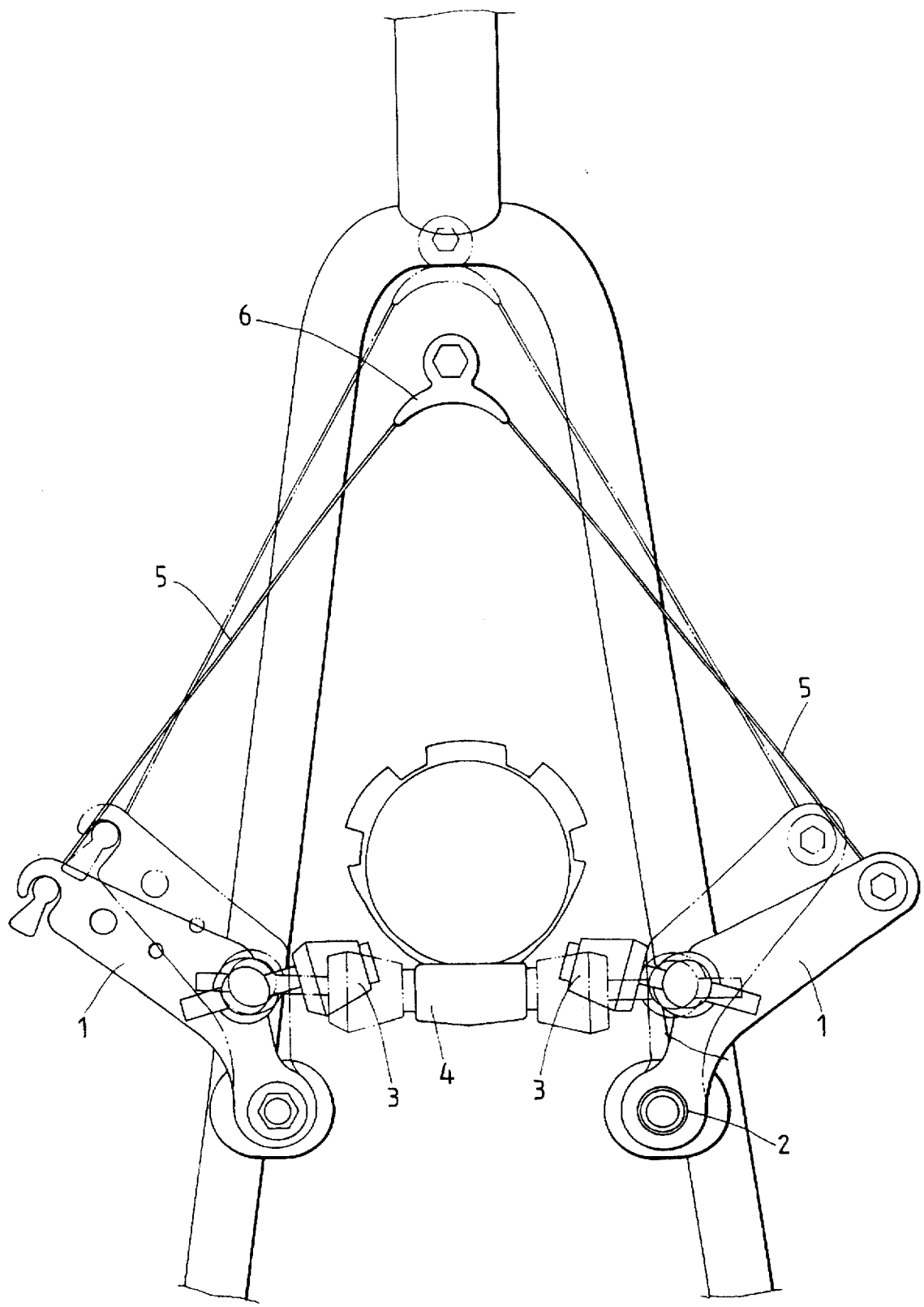
FIG. 1 shows a schematic view of a bicycle brake of the prior art.
Figure 2:
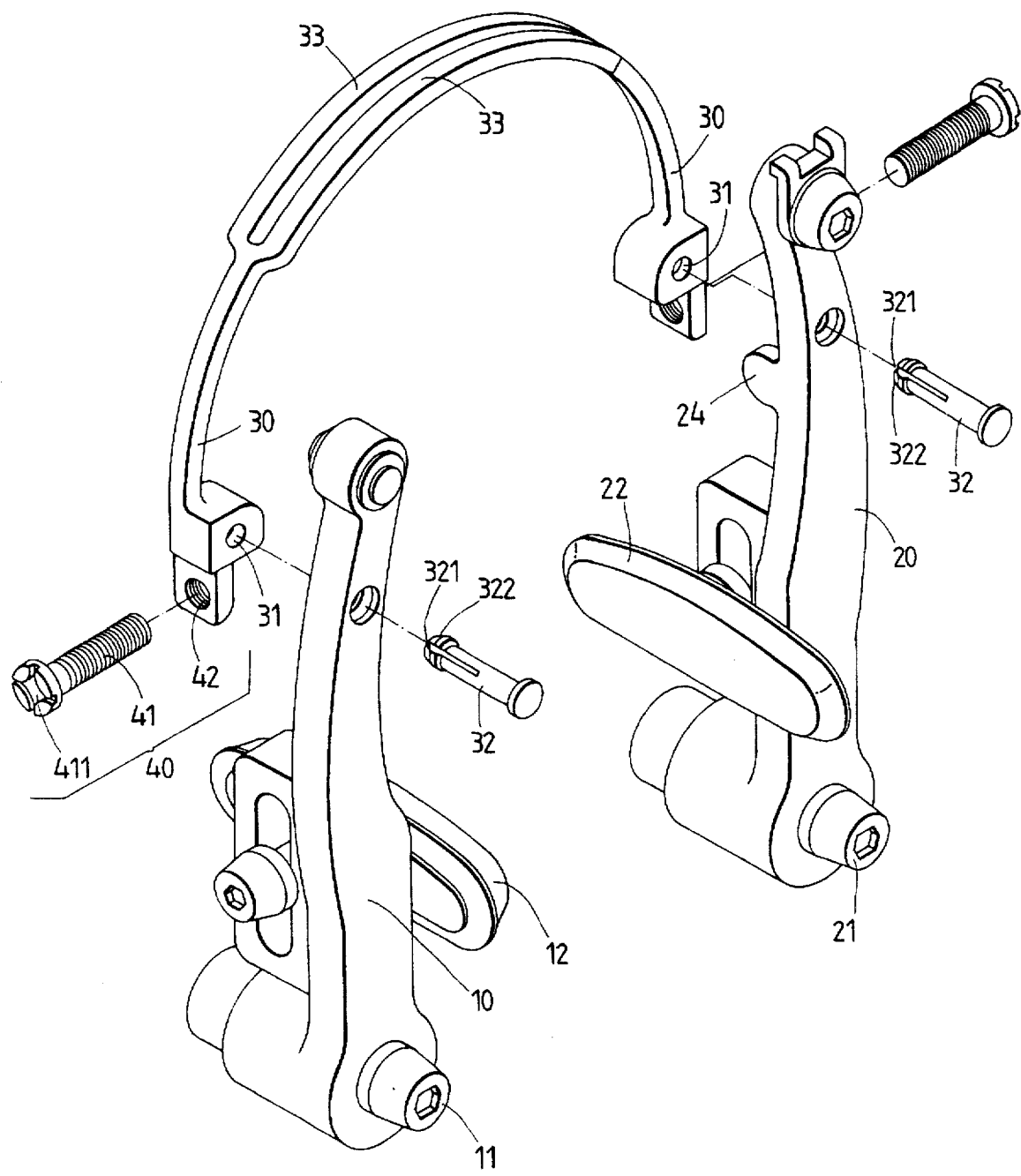
FIG. 2 shows an exploded view of a bicycle brake embodied in the present invention.
Figure 3:
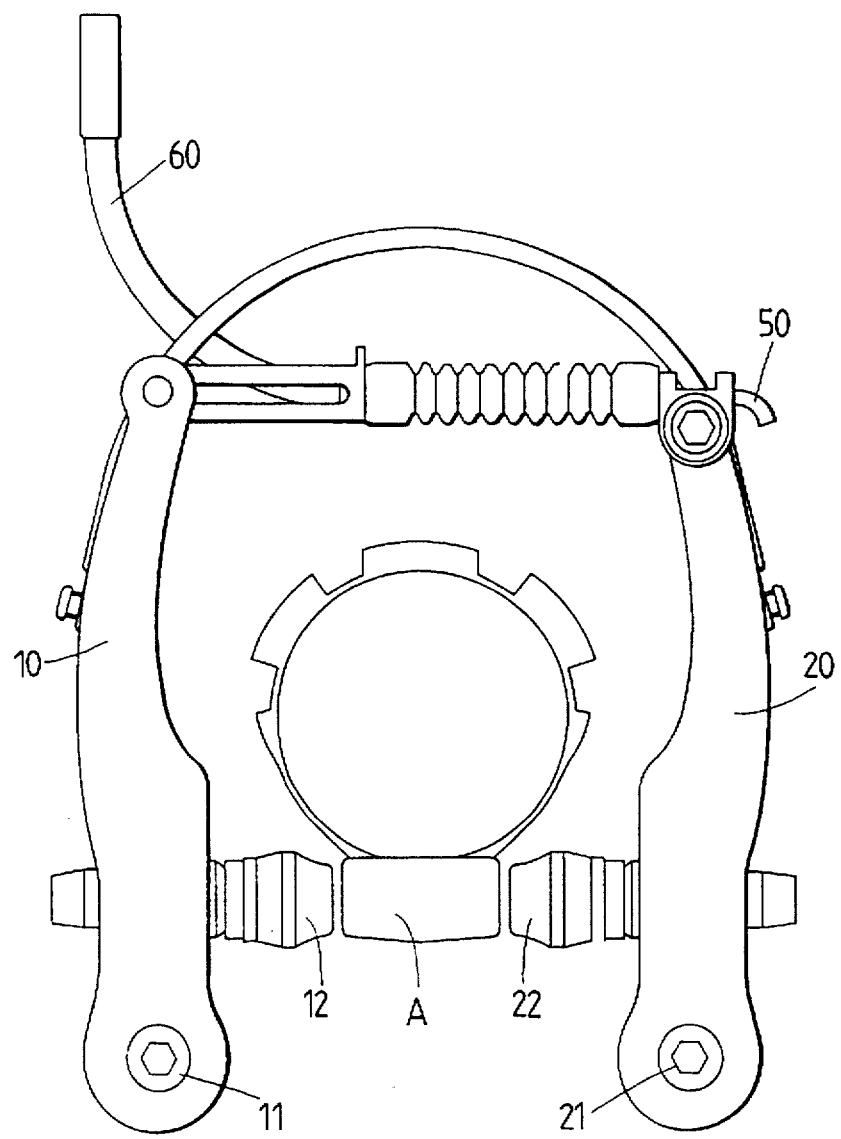
FIG. 3 shows a front partial sectional view of the bicycle brake in combination according to the present invention.
Figure 5:
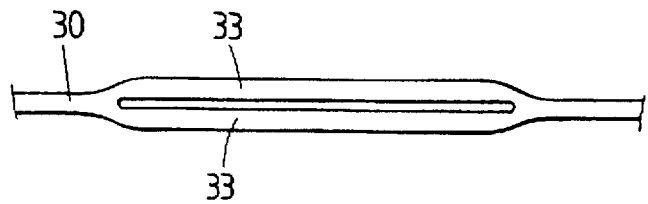
FIG. 5 shows a top view of a tension spring of the bicycle brake of the present invention.
Figure 4:
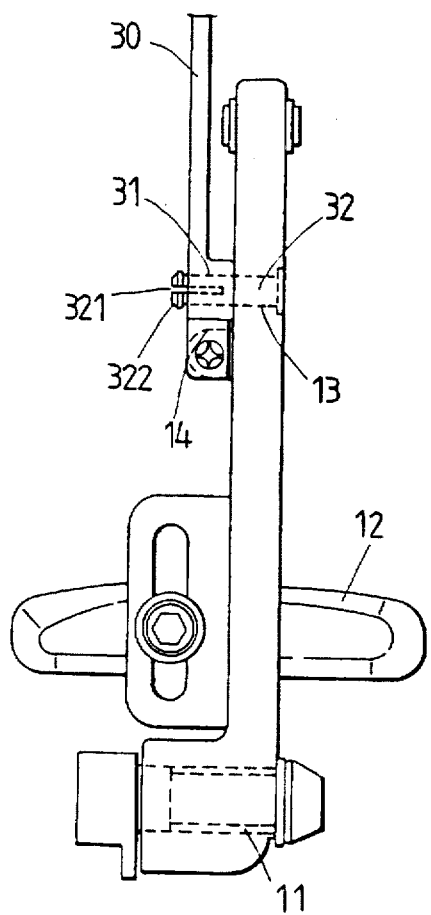
FIG. 4 shows a rear partial sectional view of the bicycle brake in combination according to the present invention.

As shown in FIGS. 2–5, an adjustable bicycle brake embodied in the present invention is composed of a first brake arm 10 and a second brake arm 20, which are symmetrical in construction with each other. The first brake arm 10 and the second brake arm 20 are provided with a pivot 11 and a pivot 21, by means of which the bottom ends of the first brake arm 10 and the second brake arm 20 are fastened pivotally with the bicycle frame. The first brake arm 10 and the second brake arm 20 are provided with brake shoes 12 and 22 opposite in location to each other for slowing or stopping the motion of a bicycle wheel A. The brake arms 10 and 20 are provided respectively at the upper end thereof with through holes 13 and 23, and at the lower end thereof with stopping blocks 14, 24. A tension spring 30 of a reinforced plastic material or a spring steel material is provided respectively at both ends thereof with a pivoting portion 31 having a pivoting hole corresponding in location to through holes 13 and 23 of the brake arms 10 and 20. The tension spring 30 is provided with two pushing devices 40 which are respectively contiguous to the pivoting portion 31. Each of the pushing devices 40 has a pushing device, e.g. a screw 41 provided with a male threaded portion engageable with a female threaded portion 42 located at the bottom ends of the tension spring 30. The pushing device 41 has a cruciform head 411 engageable with a screw driver, whereas the pushing device 41 has a tail end urging the stopping block 14 or 24 of the brake arm 10 or 20. The arcuate tension spring 30 has a reinforced portion 33, which is located at the midsegment thereof and is composed of two reinforcing ribs. The reinforced portion 33 may be of any cross-sectional profile and is intended to give the tension spring 30 an added strength to resist the concentration of stress.

The tension spring 30 is fastened at both ends thereof with the brake arms 10 and 20 by means of two pins 32 engageable with the pivoting portions 31 of the tension spring 30. The pins 32 are provided respectively with a plurality of longitudinally-oriented grooves 321 and a tapered tail end 322 so as to facilitate the assembly and disassembly of the tension spring 30 and the brake arms 10, 20.

A connection cable 50 is fastened at both ends thereof with the brake arms 10 and 20, and at the center thereof with a brake cable 60 which is fastened at another end thereof with a brake lever of the bicycle. As the brake lever is triggered, both the brake cable 60 and the connection cable 50 are actuated to drive the brake arms 10 and 20 to move in opposite directions to enable the brake shoes 12 and 22 to stop the wheel A in motion. As the brake lever is released, the brake arms 10 and 20, the brake shoes 12 and 22, the brake cable 60, and the connection cable 50 are forced by the elastic force of the tension spring 30 to return to their original positions.

Figure 6:
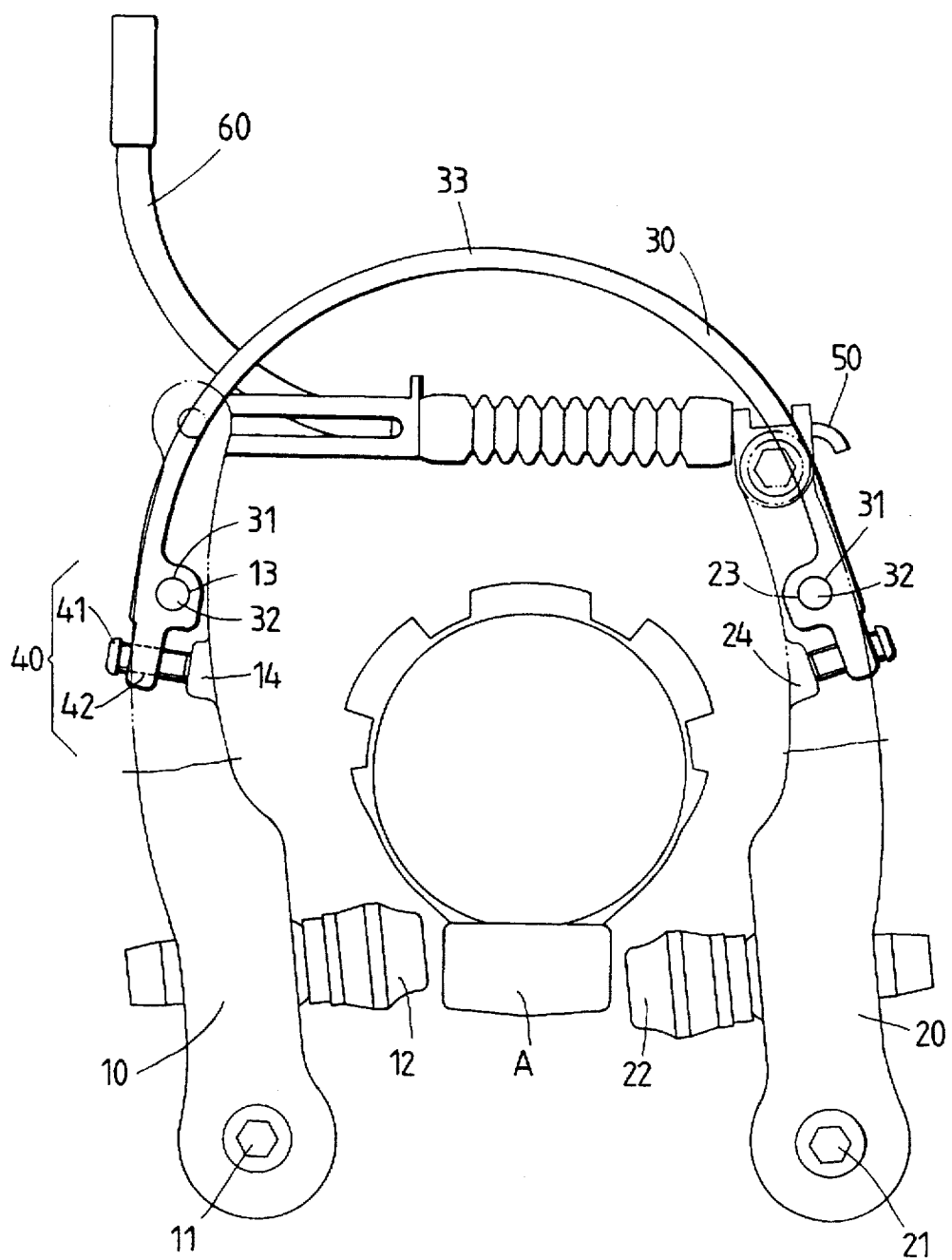
FIG. 6 is a schematic view showing a displacement of the brake arms of the bicycle brake of the present invention after the prolonged use of the bicycle brake.
Figure 7:
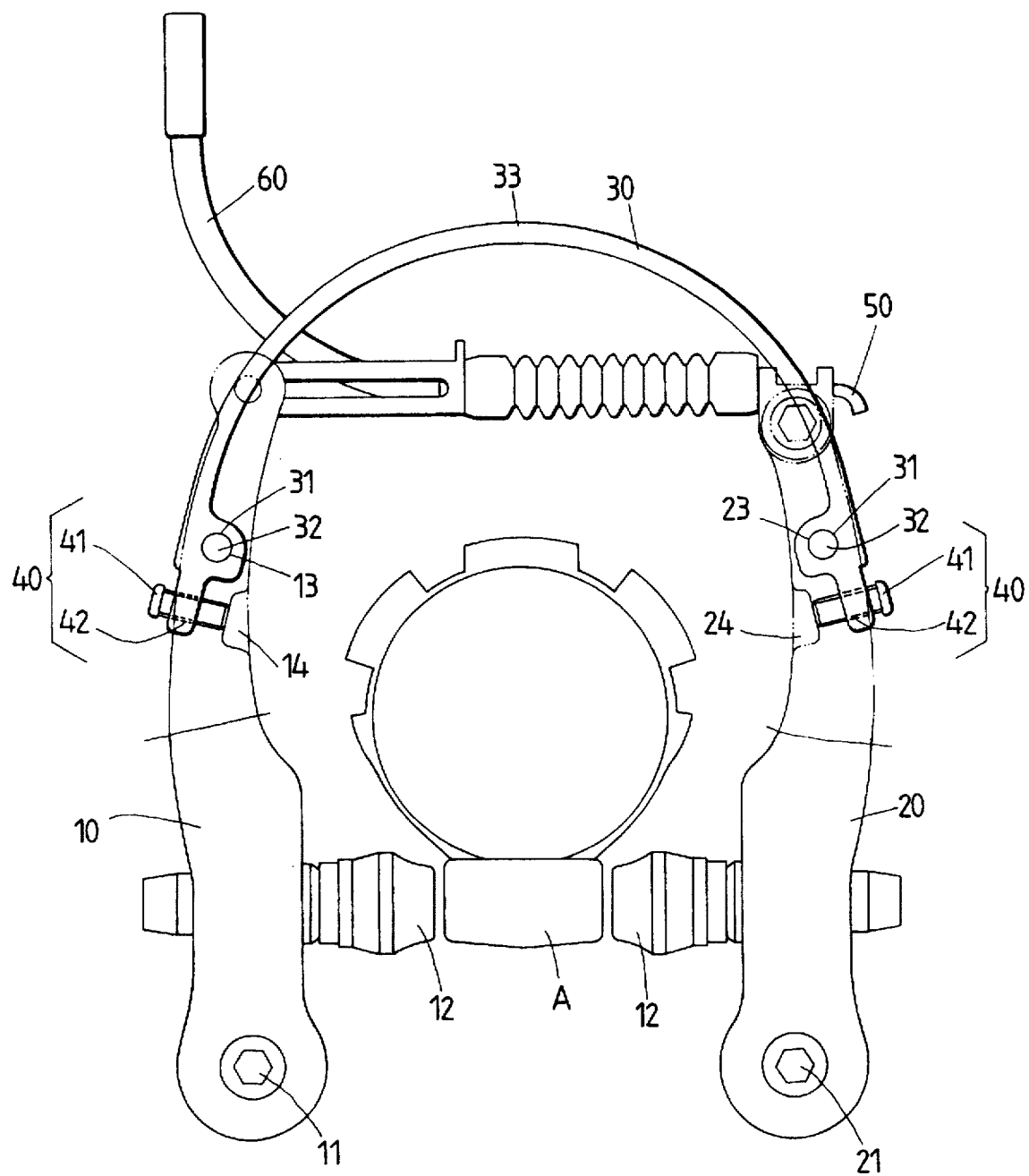
FIG. 7 is a schematic view illustrating the positions of the brake arms in relation to the bicycle wheel after the adjustment of the displaced brake arms as shown in FIG. 6.

As illustrated in FIG. 6, a prolonged use of the bicycle brake of the present invention may result in the displacement of the brake arms 10 and 20. As a result, the distances between the brake shoes 12, 22 and the bicycle wheel A are different to undermine the braking effect of the bicycle brake of the present invention. In other words, the adjustments to the brake arms 10 and 20 are called for. In the process of adjusting the brake arms 10 and 20 for correcting their displacements in relation to the bicycle wheel A, a bicyclist is required to use a cruciform screw driver to drive in the pushing device 41 on the left and to drive out the pushing device 41 on the right, so as to cause the left end and the right end of the tension spring 30 to turn clockwise on the pivoting portion 31 acting as a pivot. Through the urging of the pushing devices 41 against the stopping blocks 14 and 24 of the brake arms 10 and 20, the displacements of the brake shoes 12 and 22 can be corrected such that the brake shoes 12 and are separated equidistantly from the bicycle wheel A. It is therefore readily apparent that the bicycle brake of the present invention is free from the shortcomings of the bicycle brake of the prior art.

The embodiment of the present invention described above is to be regarded in all respects as being merely illustrative and not restrictive. Accordingly, the present invention may be embodied in other specific forms without deviating from the spirit thereof. For example, the pushing device 41 of the pushing device 40 of the present invention may be provided with a multistage retaining tenon, whereas the female threaded portion 42 of the tension spring 30 may be modified to be a miltistage retaining mortise to engage the multistage retaining tenon of the pushing device 41. The present invention is therefore to be limited only by the scopes of the following appended claims.

What is claimed is:

1. An adjustable bicycle brake comprising:

two brake arms symmetrical in construction and adapted to be fastened pivotally and respectively at one end thereof with a bicycle frame, said brake arms having respectively at another end thereof a stopping block, said brake arms provided respectively with a brake shoe fastened therewith such that said brake shoe is located between said one end and said another end; and a tension spring having two ends opposite to each other and provided respectively with a pivoting portion which is engaged with said another end of one of said two brake arms, said tension spring provided with two pushing devices each being contiguous to said pivoting portion, said pushing devices comprising a pushing device urging at each end thereof said stopping block of one of said two brake arms such that said pushing device can be displaced for adjusting a distance between said brake shoe and a bicycle wheel fastened with the bicycle frame.

2. The adjustable bicycle brake as defined in claim 1, wherein said tension spring is provided in a midsegment thereof with a reinforced portion capable of resisting a stress concentration.

3. The adjustable bicycle brake as defined in claim 2, wherein said reinforced portion is composed of two reinforcing ribs.

4. The adjustable bicycle brake as defined in claim 1, wherein said pushing device of said pushing devices is provided with a male threaded portion; and wherein said two ends of said tension spring are provided respectively with a female threaded portion engageable with said male threaded portion of said pushing device.

5. The adjustable bicycle brake as defined in claim 1, wherein said pushing device of said pushing devices is provided with a multistage retaining tenon; and wherein said two ends of said tension spring are provided respectively with a multistage retaining mortise engageable with said multistage retaining tenon of said pushing device.

6. The adjustable bicycle brake as defined in claim 1 further comprising a connection cable fastened at both ends thereof with said two brake arms such that said connection cable is fastened at a midsegment thereof with one end of a brake cable which is in turn adapted to be fastened at another end thereof with a brake lever fastened with the bicycle frame.

* * * * *